United States Patent

[11] 3,568,741

[72] Inventors Robert Herrick Wilkinson;
 Merriam Lee Gustafson, Balcarce Buenos Aires, Argentina
[21] Appl. No. 846,482
[22] Filed July 31, 1969
[45] Patented Mar. 9, 1971
[73] Assignee Deere & Company
 Moline, Ill.

[54] COMBINED TREE FELLER AND FUNGICIDE APPLICATOR
 13 Claims, 4 Drawing Figs.
[52] U.S. Cl. ................................................. 144/3,
 37/1.5
[51] Int. Cl. ..................................................... A01g 23/02

[50] Field of Search ........................................ 47/1.5, 1.7, 1; 144/3 (4), 34, 34 (1—6), 309 (34); 143/32, 32 (34), (Inquired)

[56] References Cited
 UNITED STATES PATENTS
 3,237,388 3/1966 Rishovd et al. ............... 143/32

*Primary Examiner*—Gerald A. Dost
*Attorneys*—H. Vincent Harsha, Harold M. Knoth, William A. Murray, Jimmie R. Oaks and John M. Nolan ABSTRACT: A tree-felling device including shiftable tree-severing means mounted on a mobile support frame and an applicator for automatically applying fungicide or other materials to the stump of a tree in response to the severing means being shifted to a preselected position.

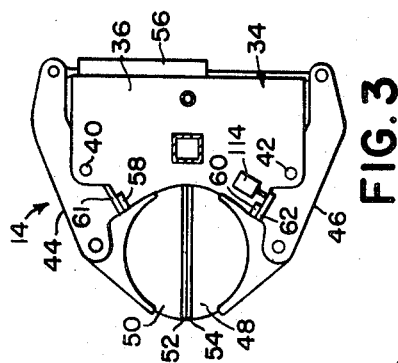
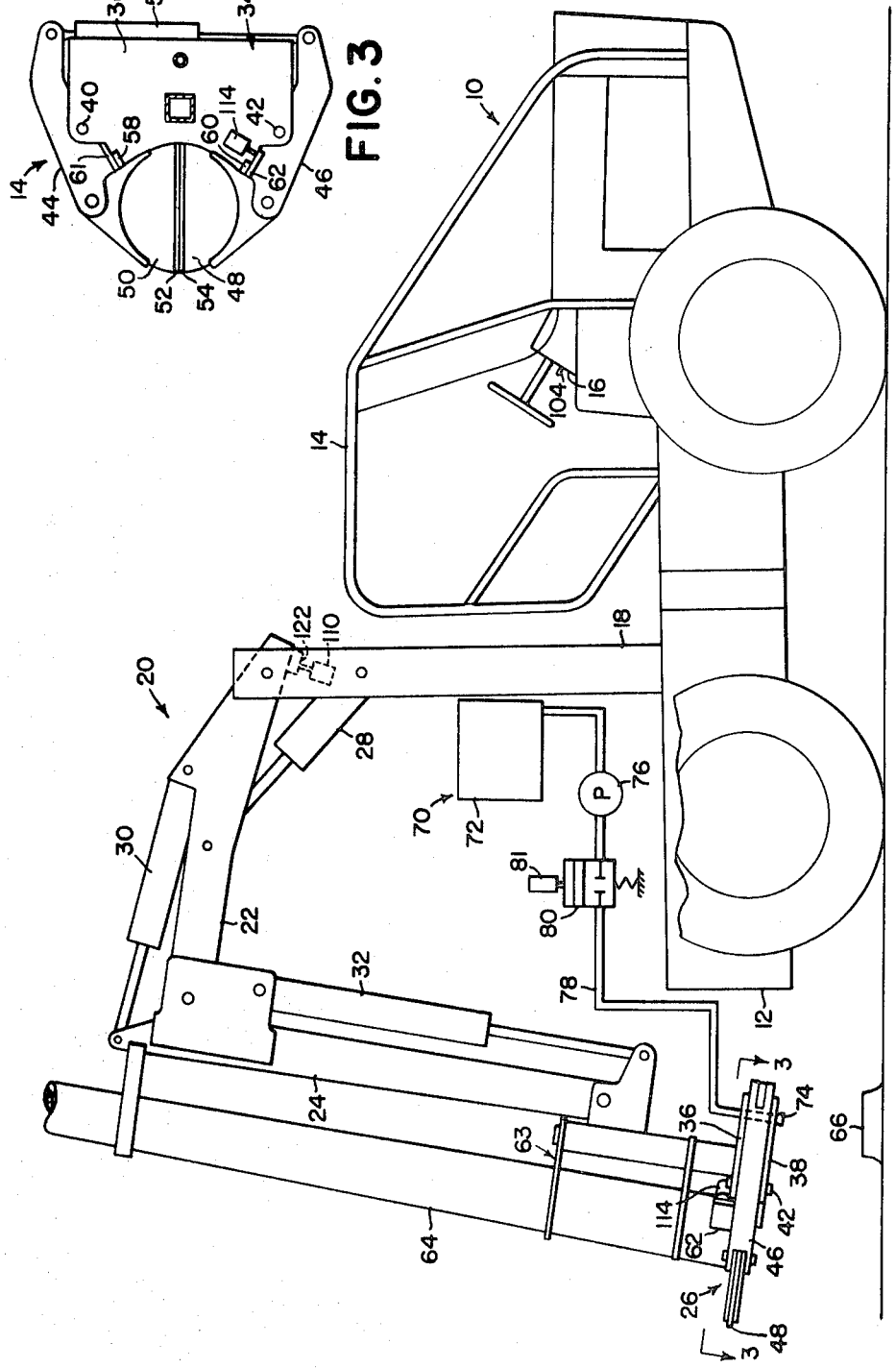
FIG. 3
FIG. 1
INVENTORS
R. H. WILKINSON
M. L. GUSTAFSON

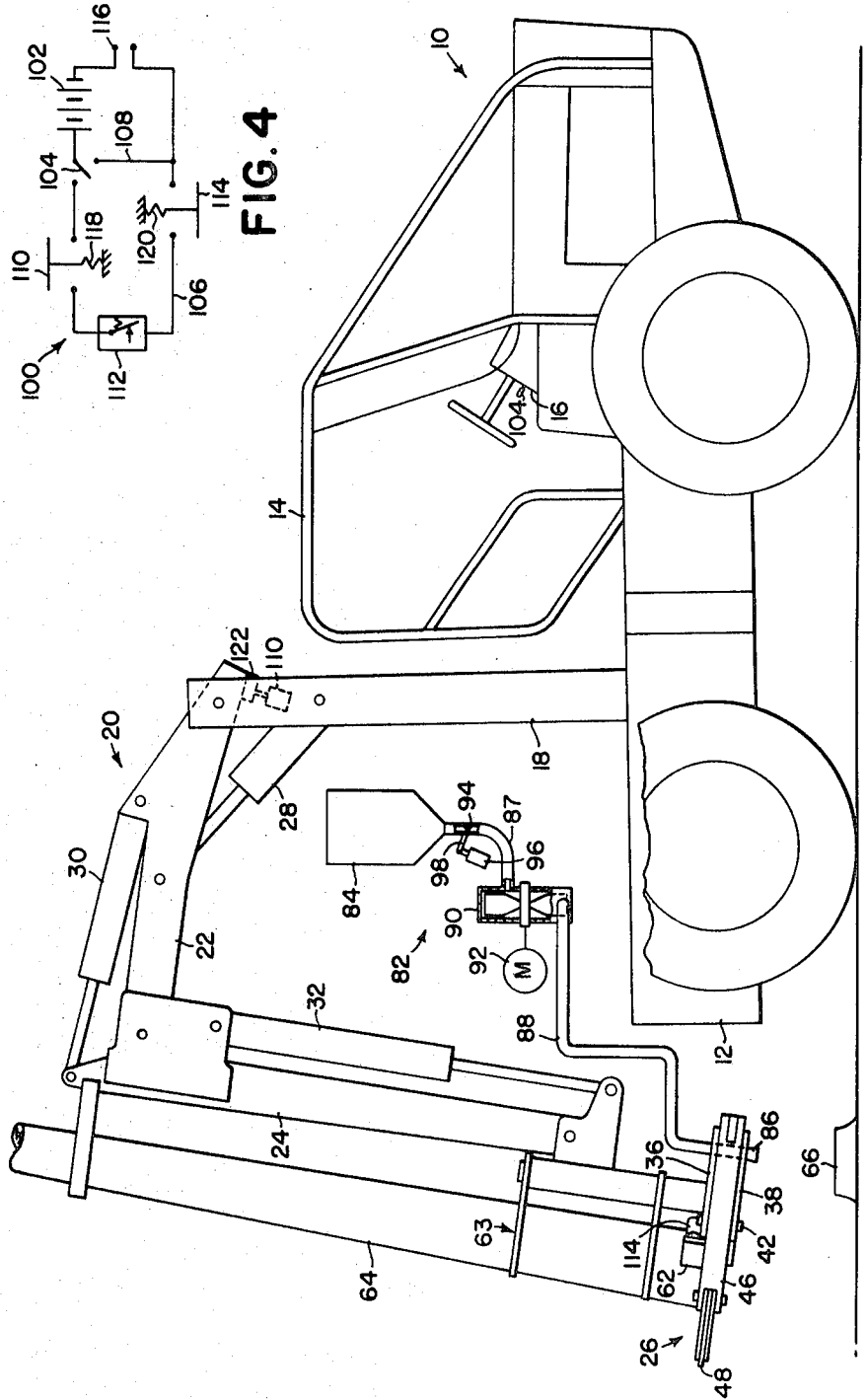
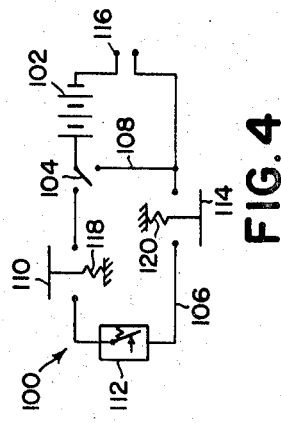

COMBINED TREE FELLER AND FUNGICIDE APPLICATOR

BACKGROUND OF THE INVENTION

This invention relates to a combined tree-felling device and fungicide applicator.

It is common practice in commercial tree harvesting to fell selected trees while leaving adjacent trees standing. One problem encountered as a result of this practice is that stumps of the felled trees become a host for fungus spores which are present in the air and some of these fungus spores are of a variety which cause tree root rot. These fungus spores often find their way into the root system of the stump and spread to the root systems of adjacent standing trees to thereby kill or damage the trees.

It has been found that certain fungicides will control tree root rot if the fungicide is applied to the tree stumps shortly after felling the trees. Heretofore, the practice has been to follow the felling operation with a second operation for depositing the fungicide on the stumps.

SUMMARY OF THE INVENTION

According to the present invention, there is provided a combined tree feller and fungicide applicator which efficiently severs trees and treats the stumps in one operation.

An object of the invention is to provide means for automatically controlling the applicator in response to preselected positions of the tree-severing means. More specifically, it is an object of the invention to provide an electric circuit containing switch means for automatically controlling the applicator, the switch means being closed in response to the tree-severing means being shifted to preselected positions.

A further object is to provide a time delay switch for controlling the applicator to discontinue the application of fungicide after a predetermined time interval.

Still a further object is to provide a manually operable switch to override the operation of the other switches.

These and other objects will become apparent from the detailed description and accompanying drawings.

BRIEF DESCRIPTION OF THE DRAWINGS

FIG. 1 is a side view schematically showing a tree-felling device and an applicator for applying liquid fungicide.

FIG. 2 is a view similar to FIG. 1 but showing an applicator for applying fungicide in dust form.

FIG. 3 is a view taken along line 3—3 of FIG. 1.

FIG. 4 is a schematic of the electric circuit for controlling the applicators of FIGS. 1 and 2.

DESCRIPTION OF THE PREFERRED EMBODIMENT

Referring now to the drawings, FIG. 1 illustrates a mobile vehicle 10 which includes a frame 12 and an operator's cab or canopy 14 inside of which is a control panel 16. A post 18 is carried on the vehicle frame 12 rearwardly of the cab 14 and supports a boom assembly 20.

The boom assembly 20 includes a first boom section 22 which is pivotally supported at one end by the post 18 and in turn pivotally supports a second boom section 24 at its other end and a typical tree-severing means, shown in the form of a shear assembly 26, is carried on the distal end of the boom section 24. Hydraulic actuators 28, 30 and 32 are provided for adjusting the boom sections 22 and 24 and the shear assembly 26.

The shear assembly 26 includes a main frame 34 constructed of upper and lower plates 36, 38 respectively, which carry pivots 40, 42 at one side. Supported on the pivots 40, 42 are levers 44, 46 respectively. Connected to one end of the levers 44, 46 are shear blades 48, 50 respectively having opposed cutting edges 52, 54. An extensible and retractable hydraulic actuator 56 is interconnected between the other ends of the levers 44, 46 and is operable for swinging the levers about the pivots 40, 42 to move the associated shear blades 48, 50 towards and away from each other. Stops 58, 60 are carried by the frame 34 and abut against stops 61, 62 carried by the respective levers 44, 46 to limit their movement toward each other. A tree-gripping device, indicated in its entirety by the reference numeral 63, is provided above the shearing assembly 26. Details of both the shearing assembly and tree-gripping device are shown and described in a pending application, Ser. No. 738,590 filed 20 Jun. 1968. The boom, shear and gripping assemblies 20, 26 and 63 in both FIGS. 1 and 2 illustrate a condition wherein a tree 64 has just been severed and elevated, thereby exposing the top of a stump 66.

An applicator assembly 70 for applying liquid fungicide or other material to a tree stump is carried by the vehicle body or frame 12 rearwardly of the post 18 and includes a container or reservoir 72 for holding a supply of liquid material, which material is delivered to a spray nozzle 74 carried by the shear assembly frame 34 by means of a pump 76 and an associated flexible conduit 78. A material flow control valve 80 is in the conduit 78 between the nozzle 74 and the pump 78 and is shiftable, by energizing an associated solenoid 81, from the closed position illustrated to an open position. The conduit 78 is shown extending directly from the valve 80 to the nozzle 74 only as a matter of convenience, it being understood that the conduit 78 may be fastened along the boom sections 22, 24 in any manner suitable for protecting the conduit from damage without interfering with the positioning of the boom sections.

Referring now to FIG. 2, there is illustrated an embodiment similar in most respects to FIG. 1 but showing an applicator assembly 82 for applying fungicide or other material in dust or powdered form. A container or hopper 84 is provided for holding the material and the material is delivered to a nozzle or deflector 86 through a conduit 88 by means of an impeller 90 which is driven by a motor 92. A valve 94 is pivotally mounted within the conduit 88 and is pivoted between open and closed positions, for permitting or interrupting the flow of material from the hopper 84 to the impeller 90, by means of a solenoid 96 which acts through an arm 98 secured to the pivot of the valve 94.

An electrical circuit 100 is provided for energizing the solenoid valve 80 of the liquid applicator and the solenoid 96 of the dust applicator and includes a source of electric current 102 which may be the battery of the vehicle 10. A manually operable, three-position switch 104 is mounted on the control panel 16 and is selectively shiftable from the open position illustrated to positions connecting the source 102 to first and second leads 106, 108 respectively. The lead 106 contains a first two-position switch 110, a time-delay switch 112, a second two-position switch 114 and a connection means 116 for selectively connecting the solenoids 81 and 96 in the circuit 100. The lead 108 bypasses the switches 110, 112 and 114 and is connected to the lead 106. The switches 110 and 114 are normally biased open by spring elements 118, 120 respectively. The switches 110 and 114 are respectively mounted on the post 18 and the shear frame 34 and are respectively closed by contact with stops 122, 62 carried by the boom section 30 and the lever 46, respectively. It is to be understood that the switch 110 may be positioned to be closed by any actuator responsive to elevating a tree from its stump, for example, the switch may be positioned adjacent an arm pivoted to the bottom of the shear assembly 26 and biased against the tree and free to traverse the space between the tree and the stump when the tree is elevated.

In operation, the boom assembly 20 is positioned adjacent a tree selected to be felled, the hydraulic actuator 56 is retracted to move the shear blades 48, 50 apart, and the shear assembly 20 is moved to position the blades on opposite sides of the tree trunk. If it is desired to automatically actuate the selected one of the applicator assemblies 70 or 82, the switch 104 is moved manually to the position connecting the source 102 to the lead 106. The switches 92 and 96 now occupy open positions, and no current flows through lead 106 to energize the solenoid 81 or the solenoid 96, whichever the case may be.

Upon extension of the hydraulic actuator 56, the levers 44, 46 are pivoted towards each other moving the shear blades to a position wherein their cutting edges 52, 54 abut. When the lever 46 is in this position, the stop 62 carried thereby is in engagement with the holding the switch 110 closed. The boom section 22 is then pivoted upwardly to separate the tree 64 from the stump 66 and when the boom section 22 is at a preselected position, the stop 122 will contact and close the switch 114, completing the circuit to energize the selected solenoids 81, 96 to shift the respective valves 80, 94 to the open positions. In the case of the liquid applicator assembly 70, the pump 76 delivers fluid to the nozzle 74 which is positioned to spray the liquid on the stump 66. In the case of the dust or powder applicator assembly 82, the impeller 90 delivers the material to the nozzle or deflector 86 which directs the material onto the stump 66. The time-delay switch 112 will open following a predetermined interval after the circuit has been completed and deenergize the solenoid to the material control valve of the selected applicator assembly.

If it is desired to operate either of the applicator assemblies without regard to the position of the lever 46 or the boom section 22, the switch 104 is moved to connect the source of electric current 102 to the lead 108, thus bypassing the switches 110, 112 and 114.

We claim:

1. A tree-harvesting device comprising: support means; a tree-severing means secured to said support means, said support means being laterally shiftable for advancing said severing means through a standing tree; a source of stump treatment material; delivery means operatively connected to said source of material for conveying the material to a tree stump, said delivery means having a normal neutral condition wherein no material is conveyed and an active condition wherein material is conveyed; and control means operatively associated with said support means and said delivery means for automatically changing the condition of the delivery means from the neutral condition to the active condition in response to shifting the support means to a preselected lateral position.

2. The invention defined in claim 1 wherein the delivery means includes conduit means having one end connected to the source of material and a nozzle at the other end for directing the material to the tree stump, and valve means in said conduit means selectively shiftable between a normally closed position and an active open position, and wherein said control means is operatively connected to said valve means for shifting the valve means between the open and closed positions.

3. The invention defined in claim 2 wherein the control means includes means for automatically returning the valve means to the closed position a predetermined time interval after the valve means is shifted to the open position.

4. The invention defined in claim 3 wherein the control means includes manually operable means for overriding the automatic operation of said control means.

5. The invention defined in claim 2 wherein the valve means is responsive to electrical current and the control means includes a source of electric current and an associated circuit connected to the valve means, and normally open switch means connected in the circuit between the source and the valve means and being mounted for contact by said support means when the support means is shifted to a preselected lateral position whereby the switch means is closed and the valve means is energized and shifted to the open position.

6. The invention defined in claim 5 and further including a manually shiftable three-position switch connected in the circuit for selectively connecting the source to the switch means or to the valve means, or disconnecting both the switch means and the valve means from the source.

7. The invention defined in claim 5 and further including a time-delay switch in the circuit for interrupting current flow to the valve means a predetermined time interval after the valve means is energized.

8. The invention defined in claim 1 wherein the support means is also shiftable vertically and wherein said control means is operative to automatically change the condition of the delivery means only after the support means has been shifted to a preselected vertical position as well as the preselected lateral position.

9. The invention defined in claim 1 wherein the delivery means is adapted to convey powder material and includes conduit means connected to the source of stump treatment material and an impeller means being in the conduit means.

10. The invention defined in claim 1 wherein the delivery means is adapted to convey liquid material and includes conduit means connected to the source of stump treatment material and a pump being in the conduit means.

11. A tree-harvesting device comprising: support means, power-operated tree-severing means secured to said support means and being laterally shiftable for advancement through a standing tree; a source of stump treatment material; delivery means operatively connected to said source of material and having a discharge end at said severing means for conveying the material to a tree stump, and control means operatively associated with said delivery means for discharging material through the discharge end and on to a remaining stump and connected to the severing means to automatically discharge material in response to shifting the severing means through a standing tree.

12. The invention defined in claim 1 wherein the control means includes a valve shiftable between a normally closed position and an active open position, and a valve control element supported on the severing means operatively connected to said valve for shifting the valve between the open and closed positions in response to shifting of the severing means.

13. A tree harvester comprising: a frame; a tree-severing device movably mounted on said frame for severing a standing tree; a source of stump treatment material; delivery means extending between the source and the severing device for conveying the material to an outlet on the tree-severing device; and control means for said delivery means operatively associated with said tree-severing device for automatically discharging material through the outlet and onto a remaining stump in response to the tree-severing device severing a standing tree.